United States Patent
Nakamura et al.

(12) 
(10) Patent No.: US 6,325,612 B1
(45) Date of Patent: Dec. 4, 2001

(54) VIBRATION APPLYING APPARATUS FOR AN INJECTION MOLDING MACHINE

(75) Inventors: Nobuyuki Nakamura; Koichi Matsubayashi; Kazuyuki Okubo, all of Nagano-ken (JP)

(73) Assignee: Nissei Plastic Industrial Co., Ltd., Nagano-ken (JP)

(*) Notice: Subject to any disclaimer, the term of this patent is extended or adjusted under 35 U.S.C. 154(b) by 0 days.

(21) Appl. No.: 09/579,935

(22) Filed: May 26, 2000

(30) Foreign Application Priority Data

May 28, 1999 (JP) .................................................. 11-150295

(51) Int. Cl.[7] .................................................. B29C 45/23
(52) U.S. Cl. ............................ 425/174; 264/69; 264/478; 425/207; 425/564
(58) Field of Search ................................ 264/69, 70, 478; 425/573, 174.2, 174.8 R, 145, 207, 208, 587, 564, 568

(56) References Cited

U.S. PATENT DOCUMENTS

| 5,145,694 | * | 9/1992 | Brams ................................ 425/174.8 |
| 5,160,466 | * | 11/1992 | Allan et al. ............................ 425/573 |
| 5,766,654 | * | 6/1998 | Groleau ................................ 425/573 |
| 5,770,131 | * | 6/1998 | Bubel et al. ........................... 425/145 |
| 6,190,601 | * | 2/2001 | Nakamura .............................. 425/207 |
| 6,203,747 | * | 3/2001 | Grunitz ................................ 425/207 |

FOREIGN PATENT DOCUMENTS 11-170318   6/1999 (JP) .

* cited by examiner

*Primary Examiner*—Tim Heitbrink
(74) *Attorney, Agent, or Firm*—Merchant & Gould P.C.

(57) ABSTRACT

A vibration applying apparatus associated with an injection molding machine for applying vibrational repetitive movements to a melt of molding materials includes a rod having a tip end received inside a heating cylinder and disposed in the proximity of a nozzle of the heating cylinder, a stationary guide supporting the rod such that the rod is movable back and forth, a rotating shaft being orthogonal to the rod, a drive motor for rotating the rotating shaft, and a cam mechanism acting between the rotating shaft and the rod so as to convert rotary motion of the rotating shaft into linear reciprocal motion of the rod. With the apparatus thus arranged, the tip end of the reciprocating rod applies vibrational repetitive movements to the melt of molding material, thereby lower the viscosity of melt. The frequency of vibrational repetitive movements can be varied by changing the rotational speed of the drive motor.

7 Claims, 7 Drawing Sheets

VIBRATION APPLYING APPARATUS FOR AN INJECTION MOLDING MACHINE

BACKGROUND OF THE INVENTION

1. Field of the Invention

The present invention relates generally to an injection molding machine, and more particularly to an apparatus for applying vibrational repetitive movements to a melt of molding materials held inside the heating cylinder of an injection molding machine so as to improve the moldability of the melt.

2. Description of the Related Art

One of the present inventors has proposed an improved screw injection molding system in which low frequency vibrations are applied to a melt of molding materials to lower the viscosity of the melt, as disclosed in Japanese Patent Laid-open Publication No. HEI-11-170318. The disclosed screw injection molding system includes a needle valve mechanism which includes, as shown here in FIG. 8, a guide 32 engaged in a block 19 connecting a heating cylinder 11 and a discharge nozzle 18, a primary cylinder 34 connected to the guide 32 via a bracket 33, a primary piston 35 slidably disposed interiorly of the primary cylinder 34, a secondary cylinder 37 formed integrally with the primary piston 35, a secondary piston 38 slidably disposed interiorly of the secondary cylinder 37, front and rear piston rods 41 and 41 extending from the secondary piston 38 in a forward-and-rearward direction, an elongated rod 44 received in the front and rear piston rods 41, 42 and fixed to the latter via bushes 43, 43, a needle 31 formed at a distal end of the elongated rod 44, and an amplitude adjusting nut 46 mounted to a proximal end of the elongated rod 44 and locked in position by a lock nut 47. In FIG. 8 numeral 12 denotes a screw slidably and rotatably received in the heating cylinder 11.

In FIG. 8, the needle 31 of the needle valve mechanism 30 is placed in an open position in which the nozzle 18 of the heating cylinder 11 is opened. When the primary piston 35 is advanced or moved in the direction of the arrow a relative to the primary cylinder 34, the needle 31 moves to a closing position in which the nozzle 18 is closed. By thus moving the primary piston 35 back and forth relative to the primary cylinder 34, the nozzle 18 can be opened and closed by the needle 31.

While the needle 31 is held in the open position of FIG. 8, the secondary piston 38 is moved reciprocally (back and forth) in the direction of the arrow b relative to the secondary cylinder 37. In this instance, the needle 31 never closes a flow path of a molten material in its fully advanced position. In its half-open position, the needle 31 thus vibrates the molten material, thereby lowering the viscosity of the molten material. The amplitude of vibration of the needle 31 is determined by the distance h between the secondary cylinder 37 and the amplitude adjusting nut 46, which can be varied by turning the amplitude adjusting nut 46 rightwardly or leftwardly.

By thus moving the needle 31 reciprocally in the direction of the arrow b, low frequency vibrations can be applied from the tip of the needle 31 to the melt of molding materials. However, since the application of vibrations to the melt in the prior arrangement relies on minute reciprocal movement of the secondary piston 38 controlled hydraulically, a controller requires a servo valve installed in a hydraulic circuit. The servo valve is expensive per se and requires a complicated control circuit. This may render the controller complicated in construction and highly expensive to manufacture.

In addition, the frequency of vibrations must be changed according to the sort of molten materials used. This requirement may enhance the difficulties in achieving servo control of the secondary piston.

SUMMARY OF THE INVENTION

It is accordingly an object of the present invention to provide a vibration applying apparatus which is simple in construction, can be manufactured at a relatively low cost, is easy to control and is able to change the frequency of vibrations easily and reliably.

To achieve the foregoing object, the present invention provides a vibration applying apparatus associated with an injection molding machine for applying vibrational repetitive movements to a melt of molding materials to improve the moldability of the melt while the melt is held within a heating cylinder of the injection molding machine. The vibration applying apparatus comprises a rod having one end received inside the heating cylinder and disposed in the proximity of a nozzle of the heating cylinder, a stationary guide supporting the rod such that the rod is movable back and forth, a rotating shaft being orthogonal to the rod, a drive motor for rotating the rotating shaft, and a cam mechanism acting between the rotating shaft and the rod so as to convert rotary motion of the rotating shaft into linear reciprocal motion of the rod, whereby vibrational repetitive movements are applied from the one end of the reciprocating rod to the melt of molding material.

Preferably, the cam mechanism is comprised of an eccentric cam provided on the rotating shaft, and a cam follower connected to the other end of the rod and held in contact with the eccentric cam. In one preferred form, the cam is a circular disk set off center on the rotating shaft, and the cam follower is a ring strap rotatably receiving therein the circular disk. The cam mechanism may further include a bearing disposed between the ring strap and the circular disk.

It is preferable that the drive motor is a variable-speed motor so that the frequency of vibrational repetitive movements created by the one end of the reciprocating rod is variable with the rotational speed of the drive motor. The amplitude of vibrational repetitive movements is constant and is two-times the eccentricity of the eccentric cam.

In another preferred form of the present invention, the rod serves also as a nozzle shut-off valve member movable between a valve opening position in which the one end of the rod is opening the nozzle, and a valve closing position in which the one end of the rod is closing the nozzle. The vibration applying apparatus further includes a cylinder actuator disposed between the rod and the cam mechanism and operable to move the nozzle shut-off valve member between the valve opening position and the valve closing position. The nozzle shut-off valve member is disposed in the valve opening position while the cam mechanism is operating. The cylinder actuator includes a cylinder connected to the cam follower and a piston mounted to the other end of the rod and slidably received interiorly of the cylinder. The nozzle shut-off valve member and the cylinder actuator jointly form a nozzle shut-off mechanism which is formed as an integral part of the vibration applying apparatus. The injection molding machine equipped with such vibration applying apparatus is compact in size and can be manufactured at a low equipment cost as compared to the conventional injection molding machine in which a vibration applying apparatus and a nozzle shut-off mechanism are provided separately at different positions.

The above and other objects, features and advantages of the present invention will become manifest to those versed in the art upon making reference to the following description and accompanying sheets of drawings in which preferred structural embodiments incorporating the principle of the invention are shown by way of illustrative examples.

DETAILED DESCRIPTION OF THE PREFERRED EMBODIMENTS

Figure 1:
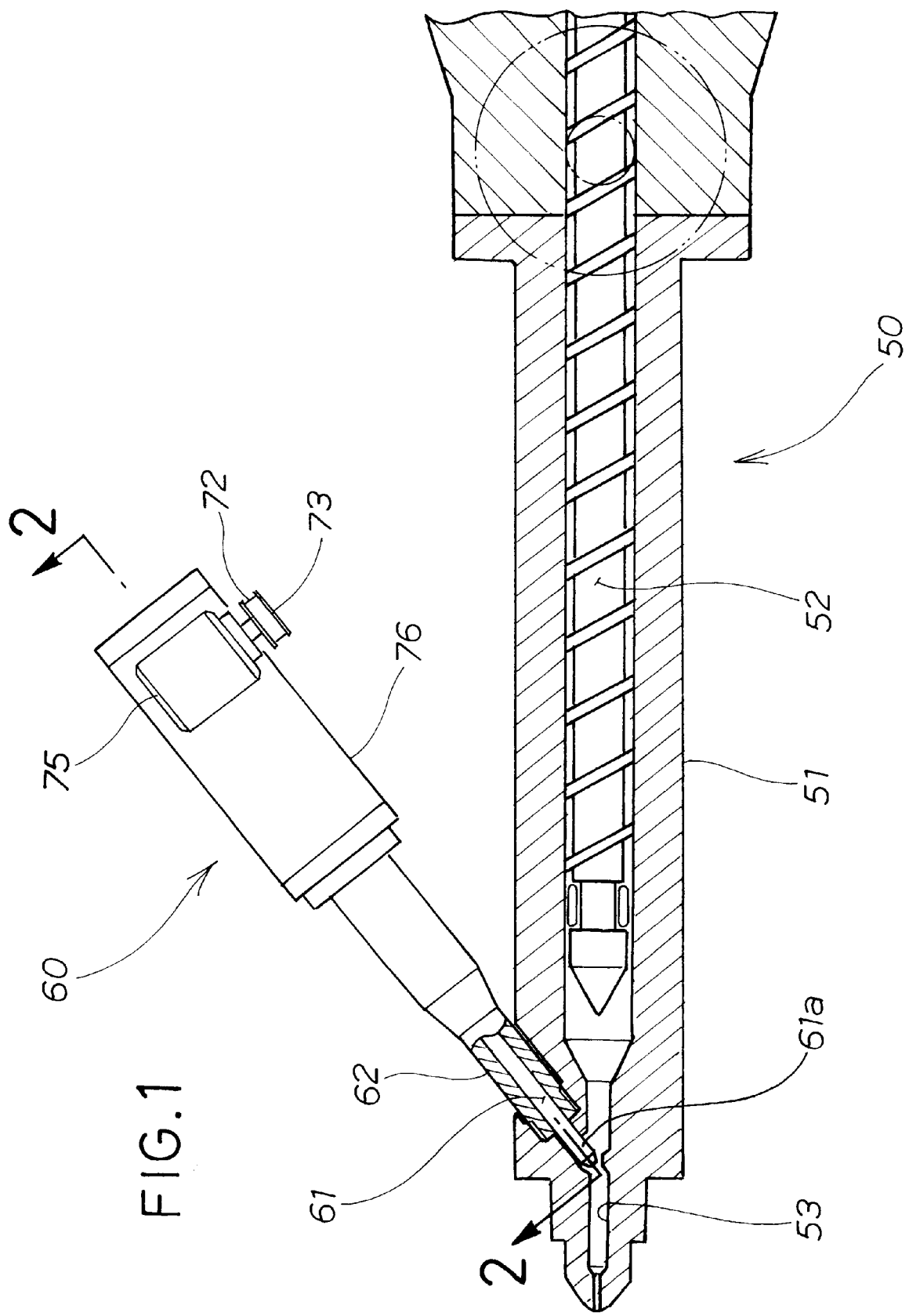
FIG. 1 is a cross-sectional view showing a part of an injection molding machine in which a vibration applying apparatus according to a first embodiment of the present invention is incorporated.

Certain preferred embodiments of the present invention will be described below in greater detail with reference to the accompanying sheets of drawings wherein like or corresponding parts are designated by the same reference characters throughout several views.

Referring now to FIG. 1, there is shown a part of an injection molding machine 50 equipped which a vibration applying apparatus 60 according to a first embodiment of the present invention.

The injection molding machine 50 includes a heating cylinder 51 and a screw 52 received in the heating cylinder 51 rotatably and movably back and forth. In operation, the screw 52 is rapidly moved reciprocally so that a melt of molding material is injected through a nozzle 53 of the heating cylinder 51 into a molding die not shown.

The vibration applying apparatus 60 is associated with the injection molding machine 50 for applying vibrational repetitive movements to a melt of molding materials to thereby improve the moldability of the melt while the melt is held within the heating cylinder 51 of the injection molding machine 50. The terms "to improve the moldability" used herein are intended to encompass the phenomena that through the application of vibrational repetitive movements to the melt, the viscosity of melt is reduced with the result that the flowability of the melt is increased to thereby ease up the injection process, and the molecular orientation is improved to thereby diminish possible warping or deformation of molded articles.

Figure 2:
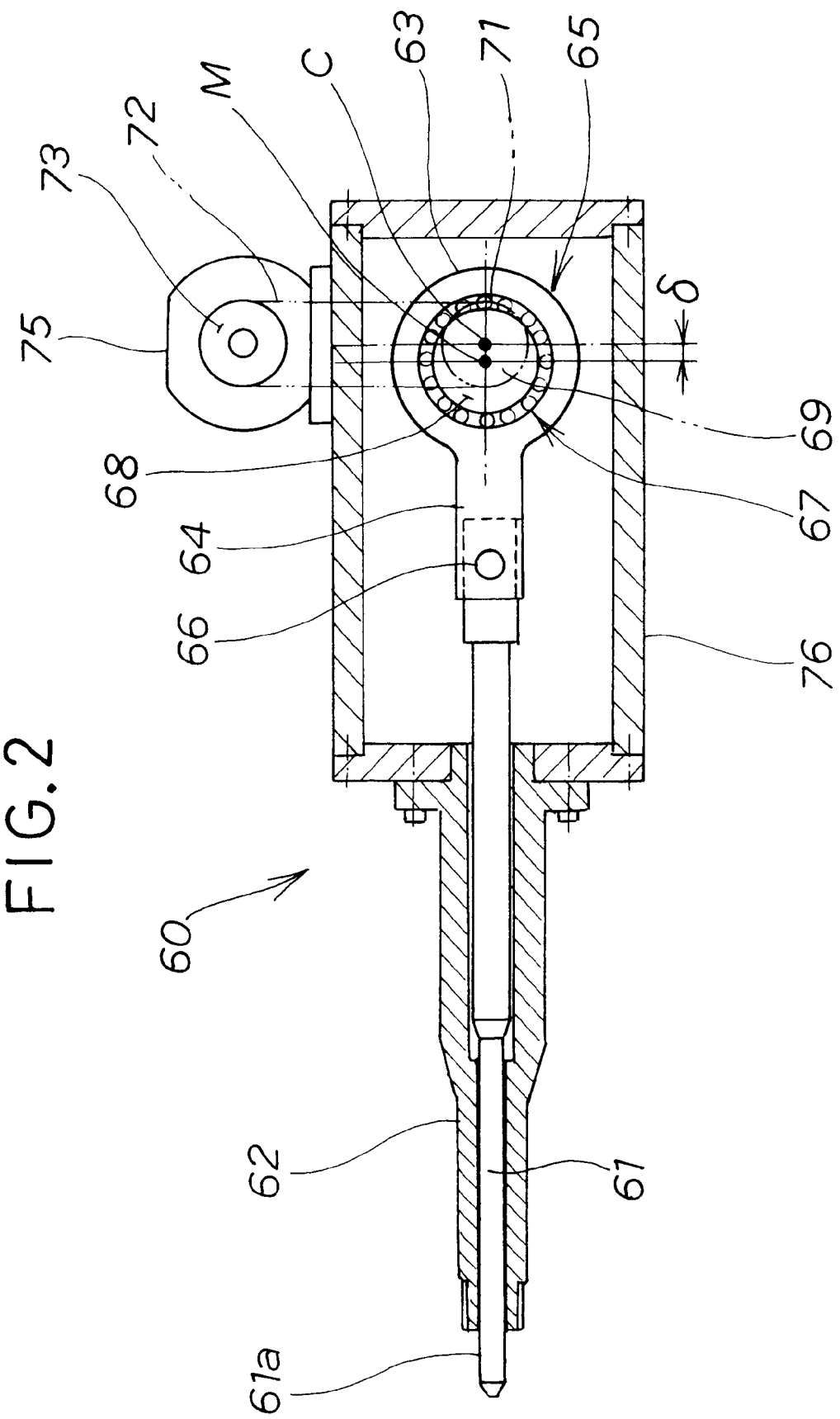
FIG. 2 is a cross-sectional view taken along line 2—2 of FIG. 1.

As shown in FIG. 2, the vibration applying apparatus 60 generally comprises an elongated rod 61, a tubular guide 62 firmly secured at one end (right end in FIG. 2) to a housing 76 and slidably supporting the rod 61 so that the rod 61 can be moved back and forth, a rotating shaft 69 rotatably mounted in the housing 76 with its own axis C being orthogonal to the axis of the rod 61, a drive motor 75 mounted on the housing 76 for rotating the rotating shaft 69, and a cam mechanism 65 acting between the rotating shaft 69 and the rod 61 so as to convert rotary motion of the rotating shaft 69 into linear reciprocal motion of the rod 61. The other end (left end in FIG. 2) of the tubular guide 62 is engaged in the heating cylinder 51. To apply vibrational repetitive movements to the melt of molding materials, the rod 61 has one end (tip end) 61a received inside the heating cylinder 61 (FIG. 1) and disposed in the proximity of the nozzle 53 (FIG. 1).

The cam mechanism 65 is comprised of an eccentric cam 68 provided on the rotating shaft 69, and a cam follower 63 connected to the other end of the rod 61 and held in contact with the eccentric cam 68. More specifically, the eccentric cam 68 takes the form of a circular wheel or disk set off center on the rotating shaft 69 by the eccentricity δ of the disk 68, that is, the distance between the axis C of the rotating shaft 69 and the center of the disk (eccentric cam) 68. The cam follower 63 is in the form of a ring strap rotatably receiving therein the disk 68 with a bearing 67 disposed therebetween. The ring strap (cam follower) 63 has an integral radial stem 64 pivotally connected to the other end of the rod 61 by means of a pin 66. While the rotating shaft 69 is rotating, the disk (eccentric cam) 68 revolves inside the ring strap 63, thereby converting rotary motion of the rotating shaft 69 into back and forth motion of the rod 61.

The rotating shaft 69 is connected in driven relation to the motor 75 by means of an endless belt 72 wound around a drive pulley 73 attached to a drive shaft (not designated) of the motor 75 and a driven pulley 71 attached to the rotating shaft 69. The motor 75 is a variable-speed motor the speed of which can be adjusted within certain limits irrespective of load.

Operation of the cam mechanism 65 will be described below with reference to FIGS. 3(A) to 3(C).

Figure 3:
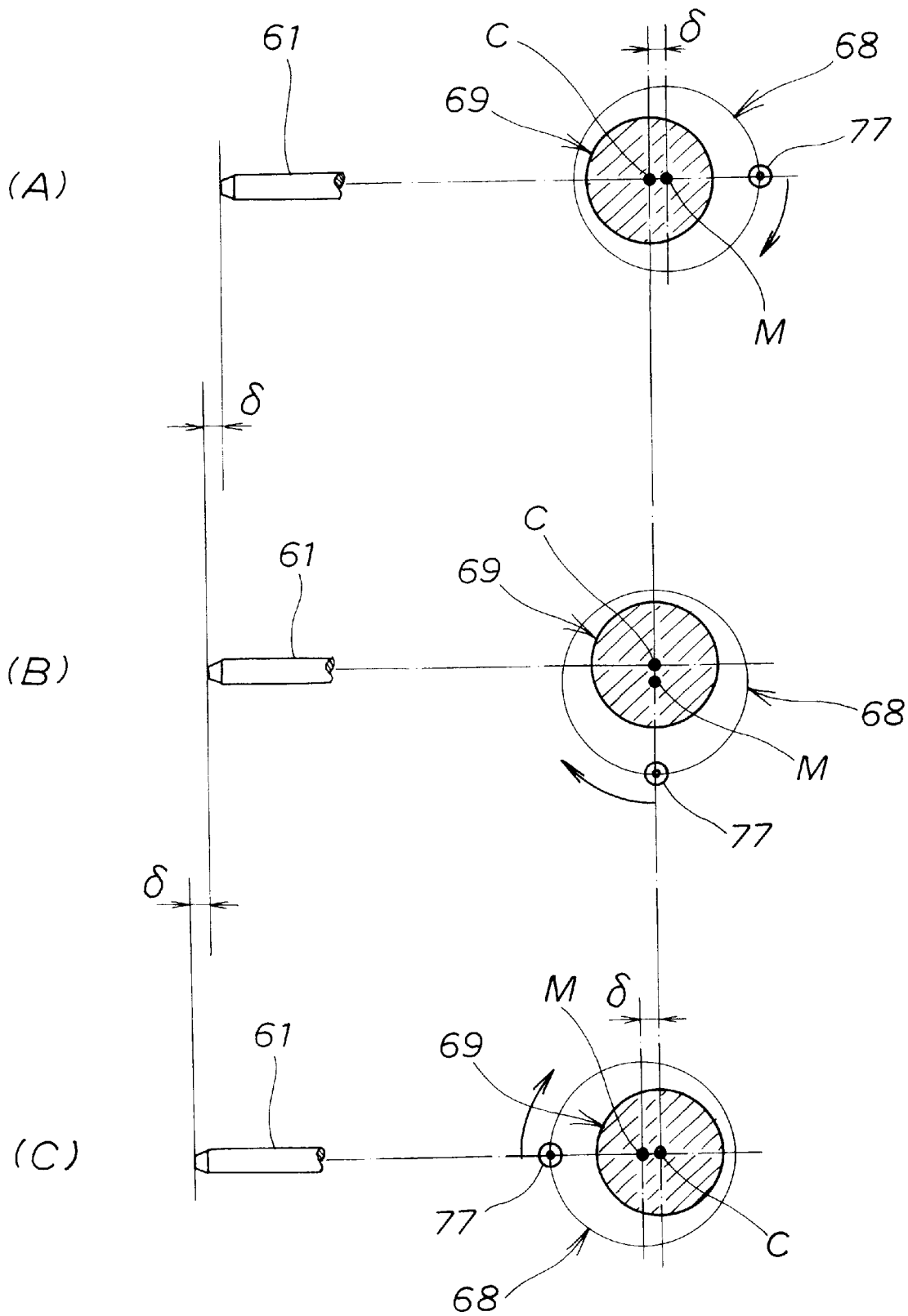
FIGS. 3A through 3C inclusive are views illustrative of the operation of a cam mechanism of the vibration applying apparatus.

For purposes of illustration, operation starts with parts shown in FIG. 3(A) in which the rod 61 is disposed in its fully retracted position, and the center M of the eccentric cam 68 is offset from the axis C of the rotating shaft 69 in a direction directly opposite from the rod 61.

When the rotating shaft 69 turns clockwise through an angle of 90°, a tip or apex 77 of the eccentric cam 68 moves leftward along a circular path and reaches the position of FIG. 3(B) which is 90° advanced in phase from the position of FIG. 3(A). In FIG. 3(B) the rod 61 is placed in its neutral position which is advanced from the fully retracted position of FIG. 3(A) by the distance equal to the eccentricity 6 of the eccentric cam 68.

A further clockwise movement of the rotating shaft 69 through an angle of 90° causes the apex 77 of the eccentric cam 68 to move to the position of FIG. 3(C) which is 90° advanced in phase from the position of FIG. 3(B). In FIG. 3(C) the rod 61 is placed in its fully advanced position which is advanced from the neutral position of FIG. 3(B) by the distance equal to the eccentricity δ of the eccentric cam 68.

By thus rotating the rotating shaft 69, the eccentric cam 68 causes the rod 61 to move back and forth repeatedly or oscillate at constant amplitude of oscillation which is two-times the eccentricity δ of the eccentric cam 68. The frequency of oscillation of the rod 61 can be adjustably varied by changing the rotational speed of the variable-speed motor 75 (FIG. 2).

Figure 4:
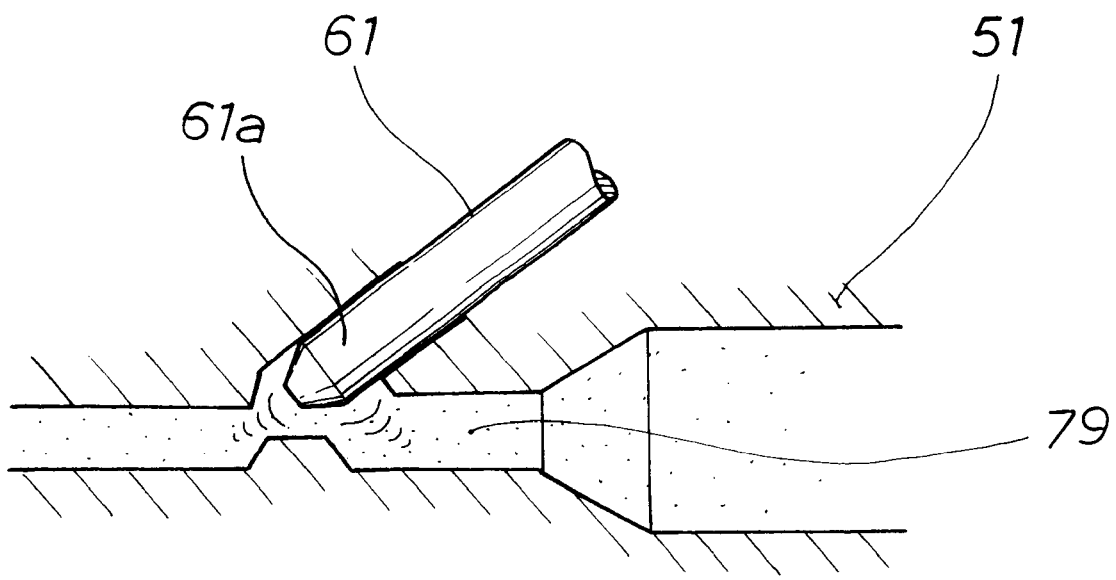
FIG. 4 is an enlarged view of a portion of FIG. 1, showing the operation of a rod of the vibration applying apparatus.

With this repeated reciprocal movement or oscillation of the rod 61, vibrational repetitive movements are applied from the tip end 61a of the oscillating rod 61 to a melt 79 of molding material which is held within the heating cylinder 51, as shown in FIG. 4. The melt 79 is thus caused to oscillate at constant amplitude of oscillation. At a given temperature, the viscosity of melt 79 can be reduced by increasing the frequency of oscillation of the melt 79. It is experimentally proved that the viscosity of PMMA (polymethyl methacrylate) at 240° C. is reduced from 126,000 Poises to 65,000 Poises when the melt oscillates at 5 Hz, to 14,000 Poises at 30 Hz, and to 9,000 Poises at 55 Hz. Similarly, the viscosity of PC (polycarbonate) at 240° C. is reduced from 63,000 Poises to 26,000 Poises when the melt oscillates at 15 Hz, and to 15,000 Poises at 40 Hz. It has revealed that it becomes possible to satisfactorily decrease the viscosity of the resin materials by oscillating or vibrating the materials at frequencies in the range of 5 Hz to 40 Hz, preferably at 15 Hz or more. As described previously, the frequency of oscillation can be adjustably varied by changing the rotational speed of the variable-speed motor 75 using a suitable controller not shown.

Figure 5:
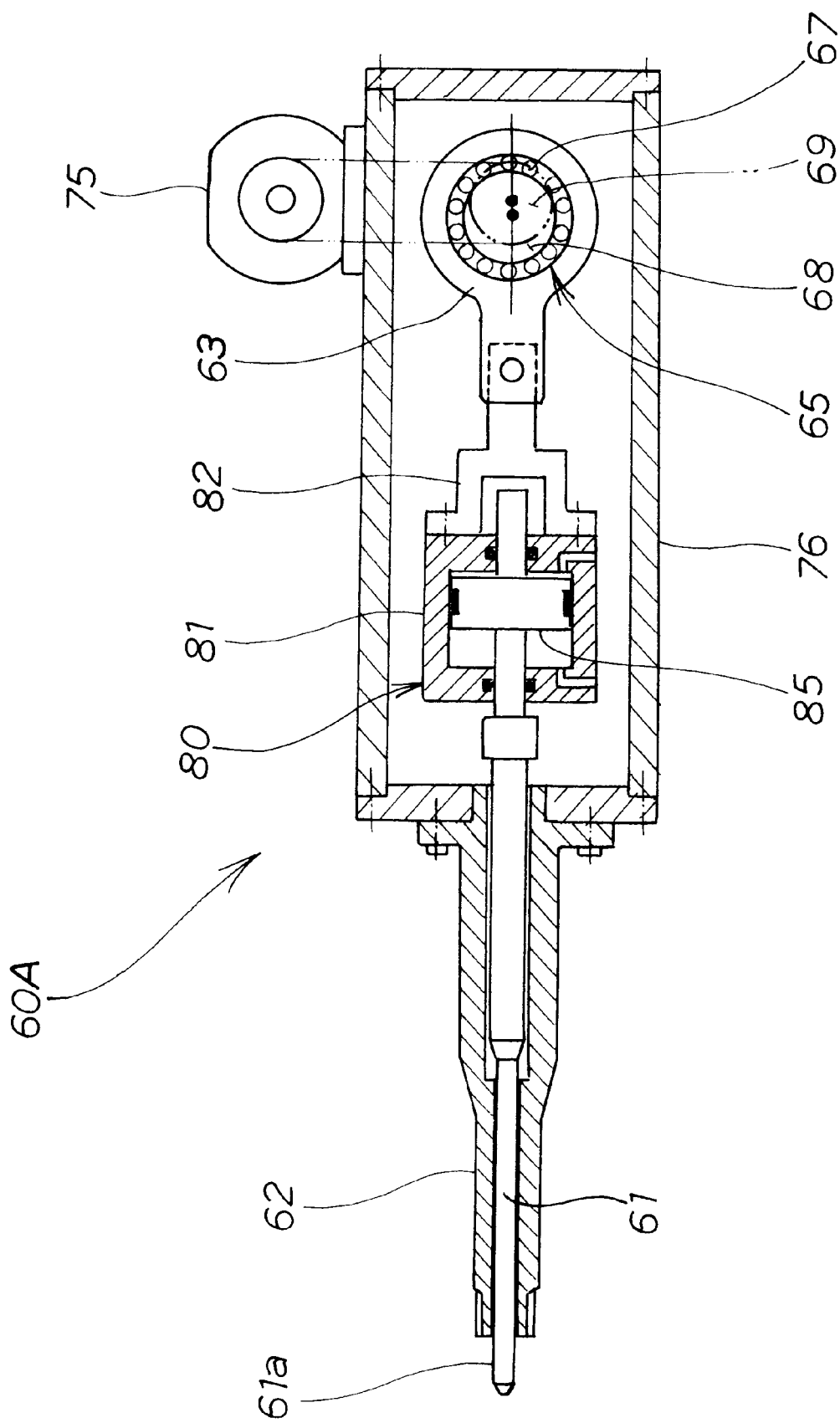
FIG. 5 is a view similar to FIG. 2, showing a vibration applying apparatus according to a second embodiment of the present invention.

Turning now to FIG. 5, there is shown in cross section a vibration applying apparatus 60A according to a second embodiment of the present invention. The vibration applying apparatus 60A differs from the apparatus 60 of the first embodiment shown in FIG. 1 only in that the rod 61 also serves as a nozzle shut-off valve member, and a cylinder actuator 80 is disposed between the rod 61 and the cam mechanism 65 for causing the nozzle shut-off valve member 61a to move between a nozzle opening position and a nozzle closing position. Other parts of the apparatus 60A are the same as those of the apparatus 60 previously described and a further description thereof can, therefore, be omitted.

The cylinder actuator 80 is comprised of a cylinder 81 connected to a cam follower 63 of the cam mechanism 85 via a link member 82, and a piston 85 mounted to the other end (proximal end) of the rod 61 and slidably received interiorly of the cylinder 81.

The vibration applying apparatus 60A of the foregoing construction operates as follows.

In the injection molding machine, a plasticizing-metering process, a waiting process, and an injection process are carried out in succession to achieve a single cycle of molding operation, and this operation cycle is repeated until a desired number of molded articles are produced.

In the plasticizing-metering process, a metered quantity of raw molding materials is fed into the heating cylinder 51 (see FIG. 1) and heated so that a melt 79 of molding materials is formed within the heating cylinder 51. In the waiting process, the melt 79 is held within the heating cylinder 51 until the screw 52 (see FIG. 1) is advanced to carry out the subsequent injection process. During the plasticizing-metering process and waiting process, it is desirable that the nozzle 53 is kept closed to avoid possible leakage of the melt 79.

Figure 6:
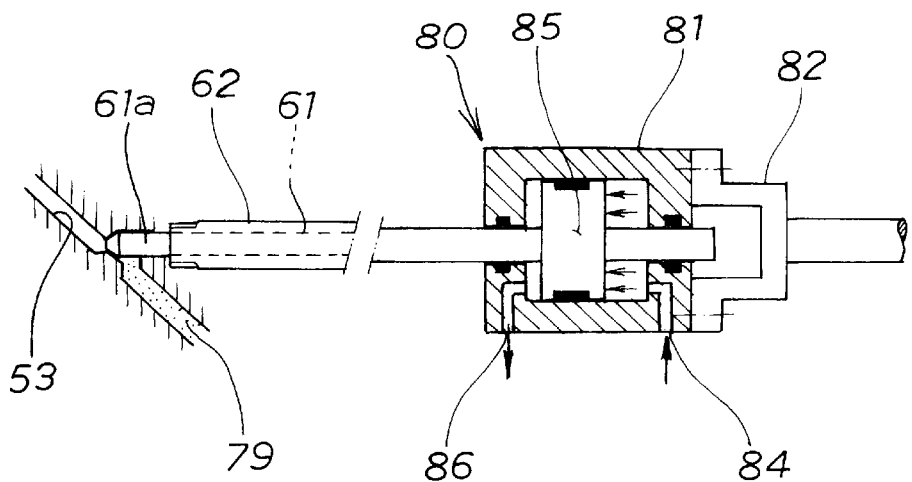
FIG. 6 is a schematic view, with parts in cross section, showing the vibration applying apparatus of FIG. 5 with a rod placed in a valve closing position.
Figure 7A:
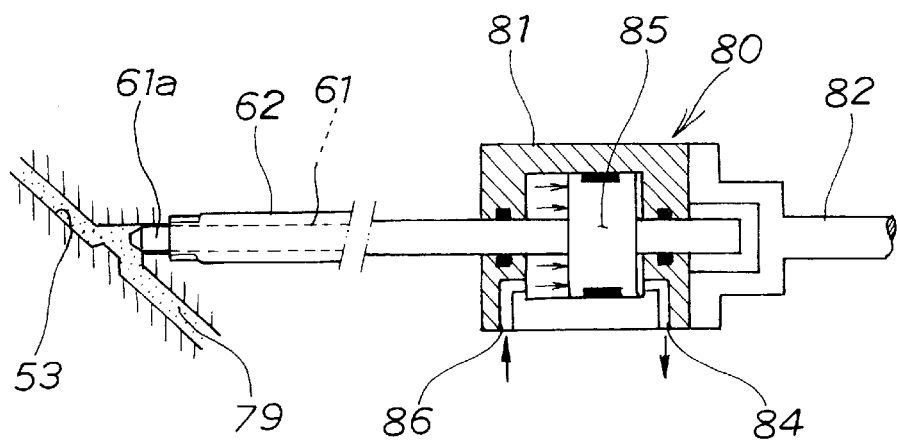
FIG. 7A is a view similar to FIG. 6, but showing a rod placed in a valve opening position.
Figure 7B:
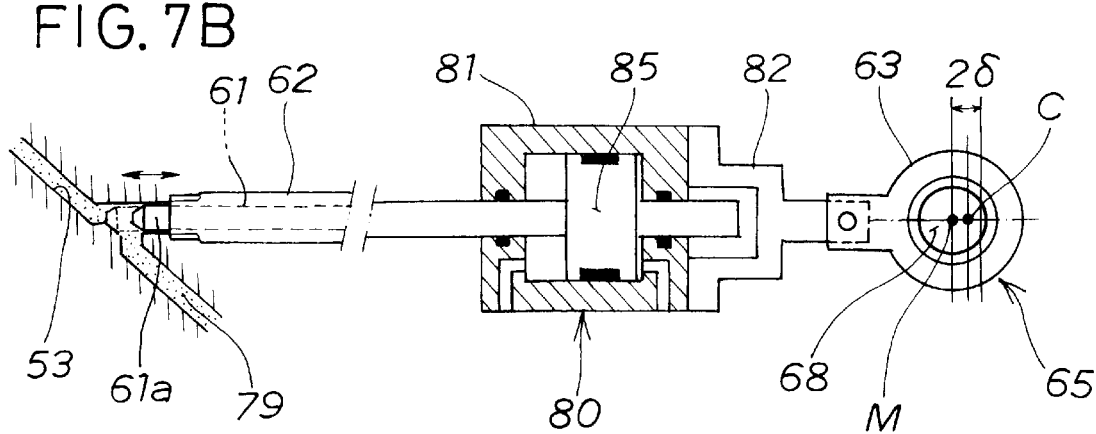
FIG. 7B is a view similar to FIG. 7A, but illustrative of the manner in which the rod is moved back and forth.
Figure 8:
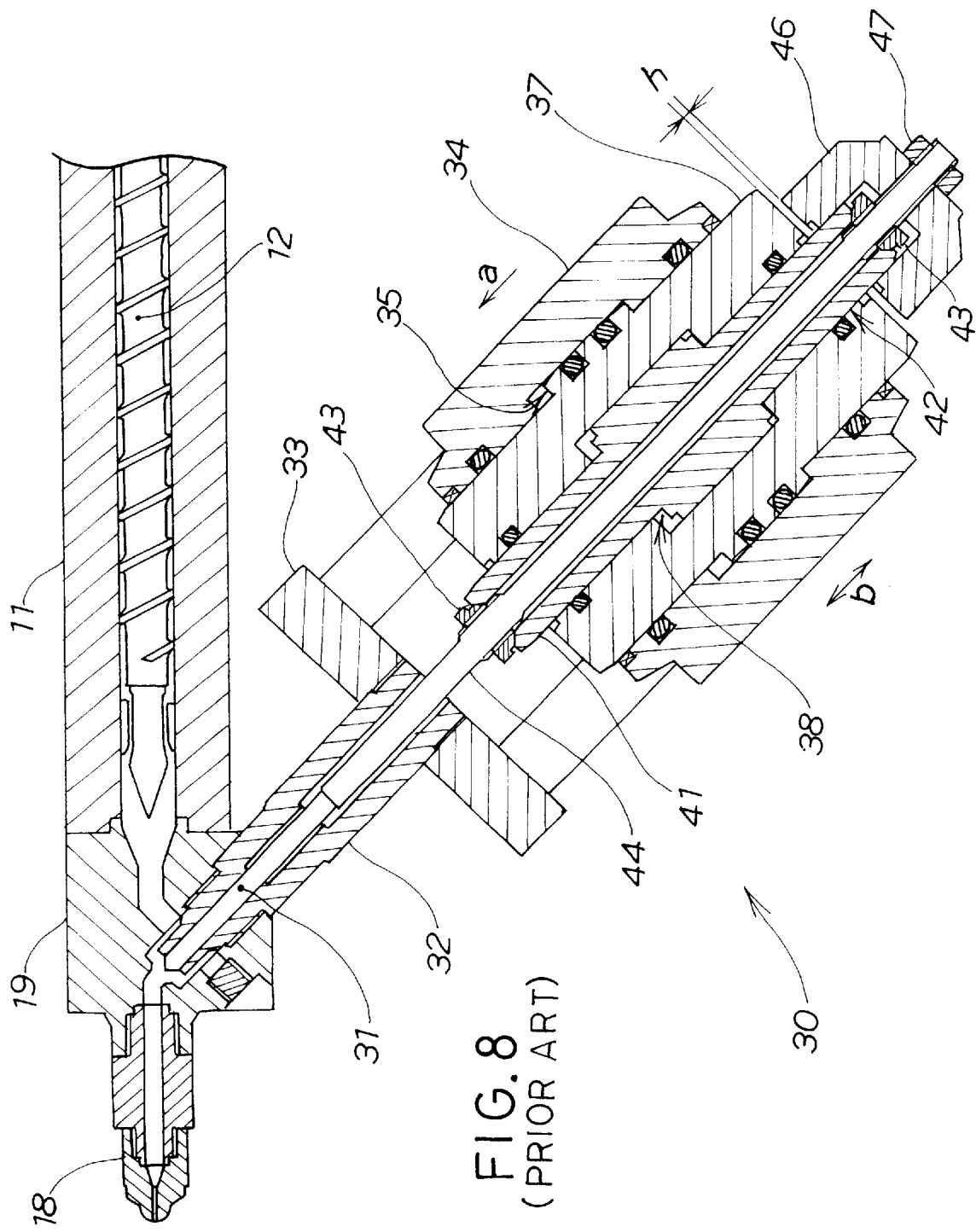
FIG. 8 is a cross-sectional view showing a conventional needle valve mechanism associated with an injection molding machine.

To deal with this desire, the vibration applying apparatus 60A includes a nozzle shut-off valve member which is formed by the tip end 61 of the rod 61 and movable, in response to operation of the cylinder actuator 80, between the nozzle closing position in which the nozzle shut-off valve member 61a is fully closing the nozzle 53, as shown in FIG. 6 and the nozzle opening position in which the nozzle shut-off valve member 61a is opening the nozzle 53, as shown FIG. 7A.

To place the nozzle shut-off valve member 61a into the nozzle closing position of FIG. 6, a working fluid is supplied from a first port 64 into the cylinder 81, thus moving the piston 85 leftward until the nozzle shut-off valve member 61a on the rod 61 comes into contact with a portion of the heating cylinder 51 across the nozzle 53, as shown in FIG. 6. By thus closing the nozzle 53 by the nozzle shut-off valve member 61a, melt 79 of molding materials is sealed within the heating cylinder 51 against leakage.

When the vibration applying apparatus 60A is to be acted upon, the working fluid is supplied from a second port 86 into the cylinder 81 to displace the piston 85 rightward, thereby moving the nozzle shut-off valve member 61a to the valve opening position shown in FIG. 7A.

Then the rotating shaft 69 (FIG. 5) is rotated to move the rod 61 back and forth through the action of the cam mechanism 65. In this instance, since the piston 85 is held immovable at its fully retracted position, the cylinder actuator 80 forms a rigid structure which is movable in unison with the rod 61 without hindering smooth oscillating movement of the rod 61.

In the apparatus 60A shown in FIG. 5, the rod 61 doubles in function as an oscillating member of a vibration applying mechanism including the cam mechanism 65 and also as a nozzle shut-off valve member of a nozzle shut-off mechanism including the cylinder actuator 80. In addition, the cylinder actuator 80 is disposed between the rod 61 and the cam mechanism 65. This means that the vibration applying mechanism and the nozzle shut-off mechanism are formed integrally with each other. The injection molding machine equipped with such vibration applying apparatus 60A is considerably smaller in size than, and can be manufactured less costly than, the conventional injection molding machine in which a vibration applying mechanism and a nozzle shut-off mechanism are provided separately at different positions.

In addition, the vibration applying apparatuses 60, 60A are simple in construction and can be manufactured at a relatively low cost because they are essentially constituted by only five structural components, namely, a rod 61, a stationary guide 22, a rotating shaft 69, a drive motor 75 and a cam mechanism 65. The motor 75 may be directly coupled with the rotating shaft 69 in which instance the drive and driven pulleys 73, 71 and the belt 72 can be omitted.

Obviously, various minor changes and modifications of the present invention are possible in the light of the above teaching. It is therefore to be understood that within the scope of the appended claims, the present invention may be practiced otherwise than as specifically described.

What is claimed is:

1. A vibration applying apparatus associated with an injection molding machine for applying vibrational repetitive movements to a melt of molding materials while the melt is held within a heating cylinder of the injection molding machine, the vibration applying apparatus comprising:

a rod having one end received inside the heating cylinder and disposed in the proximity of a nozzle of the heating cylinder;

a stationary guide supporting the rod such that the rod is movable back and forth;

a rotating shaft being orthogonal to the rod;

a drive motor for rotating the rotating shaft; and a cam mechanism acting between the rotating shaft and the rod so as to convert rotary motion of the rotating shaft into linear reciprocal motion of the rod, whereby vibrational repetitive movements are applied from the one end of the reciprocating rod to the melt of molding material.

2. A vibration applying apparatus according to claim 1, wherein the cam mechanism is comprised of an eccentric cam provided on the rotating shaft, and a cam follower connected to the other end of the rod and held in contact with the eccentric cam.

3. A vibration applying apparatus according to claim 2, wherein the eccentric cam is a circular disk set off center on the rotating shaft, and the cam follower is a ring strap rotatably receiving therein the circular disk.

4. A vibration applying apparatus according to claim 3, wherein the cam mechanism further includes a bearing disposed between the ring strap and the circular disk.

5. A vibration applying apparatus according to claim 1, wherein the drive motor is a variable-speed motor so that the frequency of vibrational repetitive movements created by the one end of the reciprocating rod is variable with the rotational speed of the drive motor.

6. A vibration applying apparatus according to claim 1, wherein the rod serves also as a nozzle shut-off valve member movable between a valve opening position in which the one end of the rod is opening the nozzle, and a valve closing position in which the one end of the rod is closing the nozzle, and further including a cylinder actuator disposed between the rod and the cam mechanism and operable to move the nozzle shut-off valve member between the valve opening position and the valve closing position, the nozzle shut-off valve member being disposed in the valve opening position while the cam mechanism is operating.

7. A vibration applying apparatus according to claim 6, wherein the cam mechanism includes an eccentric cam provided on the rotating shaft and a cam follower being in contact with the cam for causing linear reciprocal motion in response to rotation of the rotating shaft, and the cylinder actuator includes a cylinder connected to the cam follower and a piston mounted to the other end of the rod and slidably received interiorly of the cylinder.

\* \* \* \* \*